United States Patent [19]
Richards

[11] 3,747,909
[45] July 24, 1973

[54] CHARGING AISLE EXHAUST SYSTEM
[75] Inventor: John H. Richards, Beaver, Pa.
[73] Assignee: H. H. Robertson Company, Pittsburgh, Pa.
[22] Filed: Dec. 27, 1971
[21] Appl. No.: 212,498

[52] U.S. Cl............................ 266/13, 98/42, 266/15
[51] Int. Cl............................................... C21c 5/38
[58] Field of Search ..................... 98/32, 42, 29, 35, 98/85; 266/13, 35, 36 P, 15

[56] References Cited
UNITED STATES PATENTS
3,058,412  10/1962  Jueng............................ 98/42

Primary Examiner—Gerald A. Dost
Attorney—Harry B. Keck

[57] ABSTRACT

An exhaust system for preventing release to the atmosphere, of the large volume of pollutants produced in the charging aisle during the introduction of a "hot charge" and a "cold charge" into a high-temperature furnace, such as a basic oxygen furnace. The exhaust system provides a shaft directly above the charging aisle and adjacent to the furnace. The shaft directs the pollutants from the charging aisle to suitable exhaust means which, in turn, directs the pollutants to pollution control apparatus.

7 Claims, 6 Drawing Figures

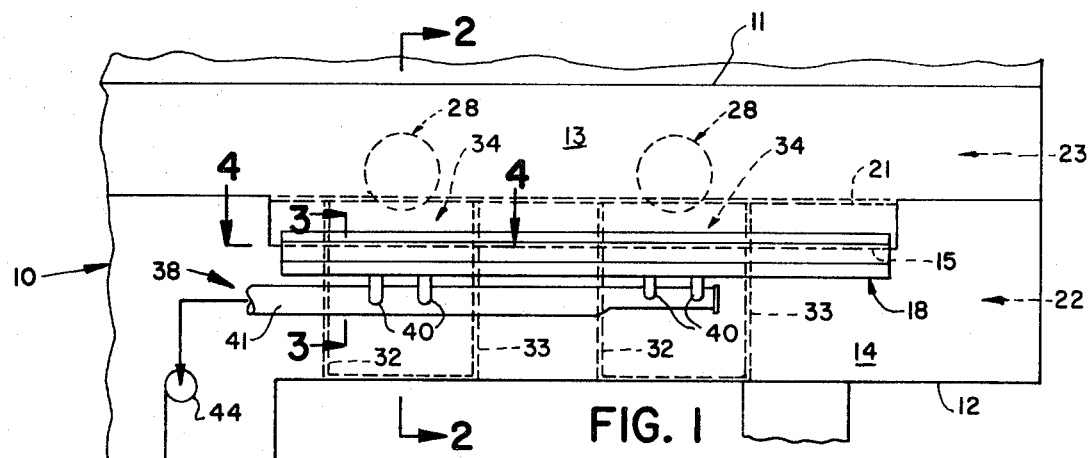
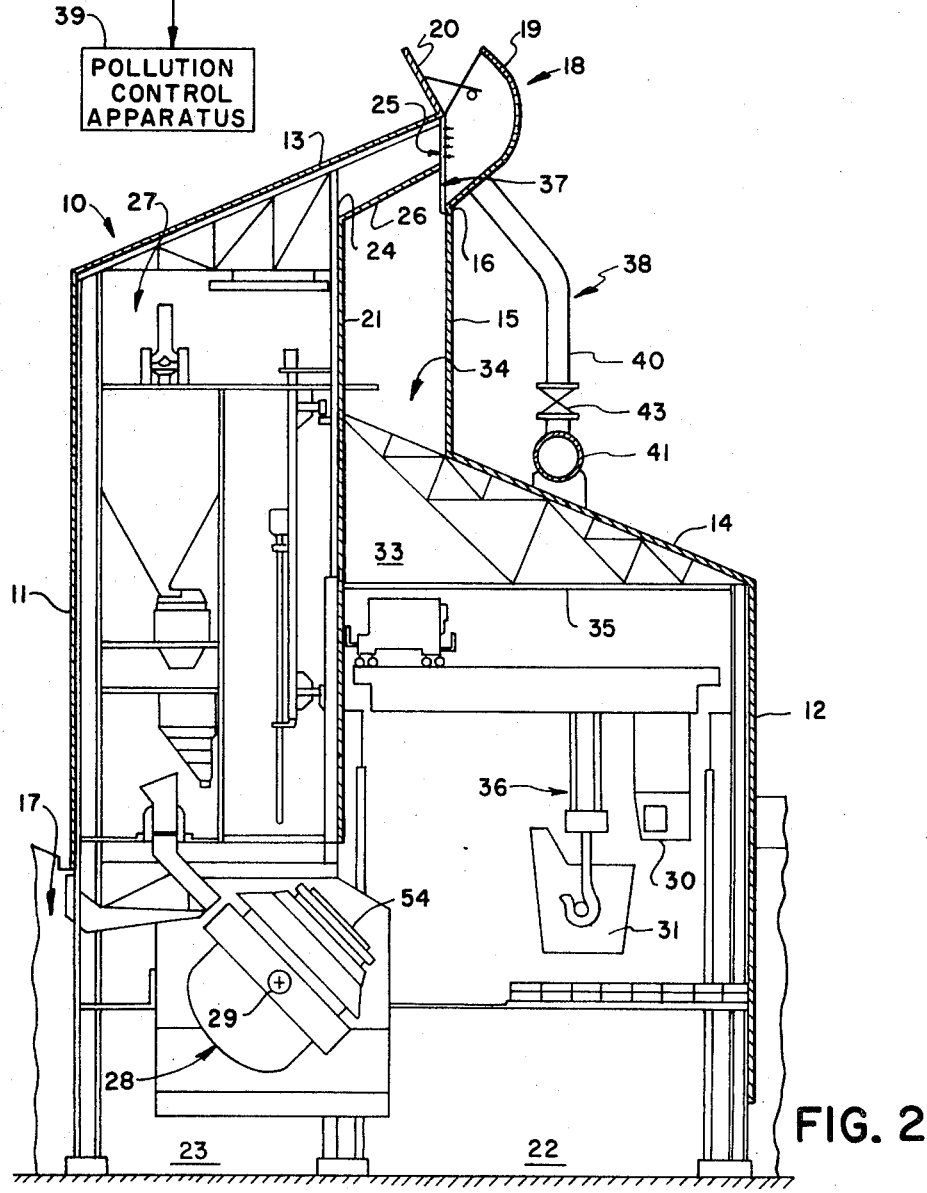

PATENTED JUL 24 1973 3,747,909

CHARGING AISLE EXHAUST SYSTEM

BACKGROUND OF THE INVENTION

1. Field of the Invention

This invention relates to buildings for steel-making process equipment, and more particularly to an exhaust system for capturing pollutants from the charging aisle of the building and directing the same to pollution control apparatus.

2. Description of the Prior Art

The basic oxygen steel-making process is widely used in the steel industry for producing high quality steel in minutes rather than hours. The basic oxygen steel-making process is carried out in a trunnion mounted furnace having a top opening for charging and a tap hole near the top opening. During the charging operation, the furnace is rotated into a tilted position wherein the top opening is presented in the charging aisle. A "hot charge" of hot metal (pig iron) and a "cold charge" of scrap steel is introduced into the furnace through the top opening.

A large volume of pollutants are emitted during the charging operation. Heretofore such pollutants have been permitted to ascend through the charging aisle and have been exhausted to the atmosphere.

The furnace is restored to a vertical position and flux, usually limestone, is deposited into the furnace. Thereafter a water cooled lance is lowered into the top opening of the furnace and high purity oxygen is blown downwardly through the lance into the furnace for oxidizing the impurities in the charge. At the termination of the purification, the lance is withdrawn from the top opening and the furnace is tilted to pour the finished heat of steel through the tap hole into a teeming ladle.

Control of the hot gases, vapors, fumes and dust emitted during the purification cycle is briefly described in U.S. Pat. No. 3,058,412 (C.F. Jueng, Oct. 16, 1962). Recently, an arrangement has been devised which attempts to use the exhaust stack employed during the purification cycle, for controlling the pollutants emitted during the charging operation. That arrangement utilizes a hood which extends over the open top of the tilted furnace and which communicates with the purification cycle exhaust stack. A relatively small hood must be used to avoid interfering with the movement of the charging ladle. This arrangement has not been successful. It is estimated that only about 40 percent of the emitted pollutants are captured by the hood - the remaining 60 percent being discharged to the atmosphere.

SUMMARY OF THE INVENTION

The principal object of this invention is to provide a charging aisle exhaust system by which substantially all of the pollutants emitted during a charging operation are captured and directed to pollution control apparatus.

The present invention provides improvements in a building of the type housing steel-making process equipment including a high-temperature furnace and charging apparatus. The building has opposed walls and a roof. An interior, vertically presented, longitudinal baffle positioned intermediate of the opposed exteriorwalls, divides the building into a first side portion (charging aisle) containing the charging apparatus; and a second side portion (furnace aisle) containing the high-temperature furnace. Ventilator means is provided at the roof for a discharging ventilation air from the building to the atmosphere. The ventilator means has a ventilator inlet opening communication with the first and second side portions of the building; and a ventilator discharge opening.

In accordance with the present invention, flow control means is provided for preventing the flow of gases from the first side portion (charging aisle), through the ventilator means to the atmosphere during a charging operation. Exhaust means having an inlet communicating with the first side portion between the charging apparatus and the flow control means is provided for withdrawing pollutants emitted during the charging operation from the first side portion and directing the same to pollution control apparatus. The term "pollutants" as used in the present specification and claims refers to the undesirable fumes, smoke, solids and the like emitted during the charging operation and which are entrained by the furnace effluent stream.

Further in accordance with the present invention vertically presented transverse baffles are provided within the charging aisle and have lowe edges spaced above the charging apparatus. The transverse baffles reside on opposite sides of the furnace and cooperate with the longitudinal baffle and the exterior wall of the charging aisle to define a charging aisle ventilator shaft communicating with the ventilator means.

Still further in accordance with the present invention, the aforesaid flow control means may comprise the damper presented at the discharge opening of the ventilator means.

BRIEF DESCRIPTION OF THE DRAWINGS

FIG. 1 is a fragmentary plan view of a building housing basic oxygen steel-making process equipment;

FIG. 2 is a fragmentary cross-sectional view taken along the line 2—2 of FIG. 1;

DESCRIPTION OF THE PREFERRED EMBODIMENT

Figure 3:
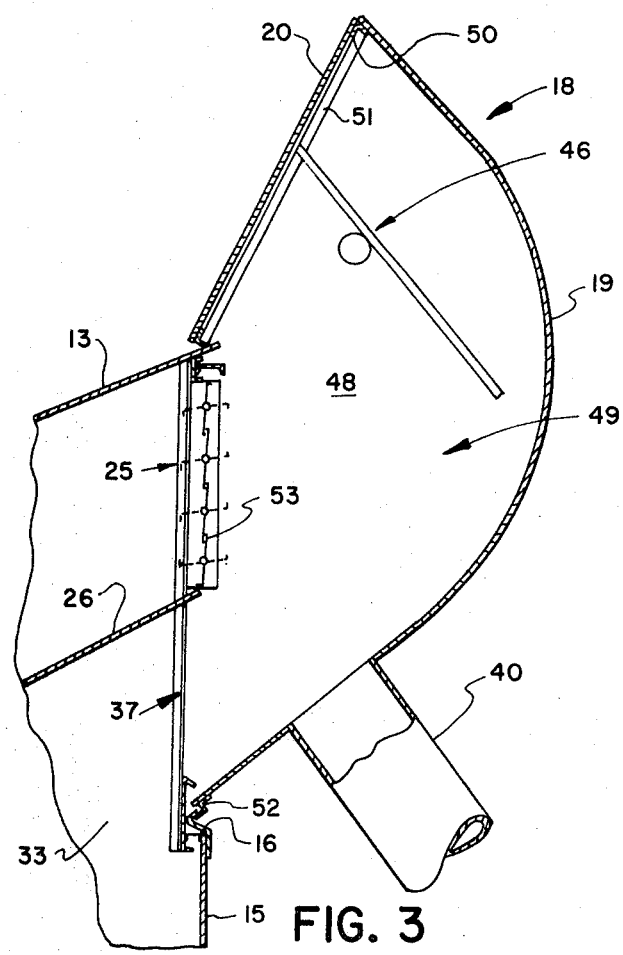
FIG. 3 is a fragmentary cross-sectional view taken along the line 3—3 of FIG. 1.

FIGS. 1 and 2 illustrate a typical building 10 having exterior walls 11, 12; upper and lower pitched roofs 13, 14 extending inwardly from the exterior walls 11, 12; and an exterior wall 15 extending upwardly from the lower pitched roof 14. The exterior wall 15 terminates in an upper edge 16 (FIGS. 2 and 3) which is spaced from the adjacent edge of the upper pitched roof 13. Ventilator means, such as a longitudinal monitor ventilator 18 is located at the peak of the roof 13. The monitor ventilator 18 includes a lateral cowling 19 and a horizontally hinged damper blade 20 which is pivoted by operator means 46 between an open position (FIG. 2) and a closed position (FIG. 3). A ventilator of this type is described generally in U.S. Pat. No. 2,009,870 issued to George E. Black and assigned to the assignee of the present invention.

Within the building 10 there is provided a vertically presented longitudinal baffle 21 which extends intermediate of the exterior walls 11 and 12, 15 and divides the same into a first side portion or charging aisle 22 and a second side portion or furnace aisle 23. The longitudinal baffle 21 terminates at an upper edge 24 at a level below the roof 13. A splitter baffle 26 extends from the upper edge 24 of the longitudinal baffle 21 toward the monitor ventilator 18. It will be observed in FIG. 2 that the longitudinal baffle 21 and the splitter baffle 26 cooperate with the exterior wall 11 and pitched roof 13 to define a furnace aisle ventilator shaft 27 which communicates with the monitor ventilator 18 through an opening 25.

It will be appreciated that an enclosed teeming aisle 17 (FIG. 2) is provided on that side of the furnace aisle 23 opposite the charging aisle 22. The teeming aisle 17 contains conventional apparatus (not illustrated) for accepting a finished heat of steel from the furnace 28 and for transferring the same to teeming ladles.

Within the building 10 one or more oxygen furnaces 28 are provided in the furnace aisle 23. As shown in FIG. 2, each furnace 28 is mounted for tilting movement on trunnions 29. The furnace 28 has an open top 54 and a tap hole (not illustrated). During the charging operation, the furnace 28 is tilted clockwise (FIG. 2) so that the open top 54 is presented in the charging zone 22. The charging zone 22 contains charging apparatus 35, such as, an overhead crane 30 carrying a ladle 31 for introducing a "hot charge" into the furnace 28. During the introduction of the "hot charge", a large volume of pollutants are emitted which are captured by means of the exhaust system of this invention and directed to pollution control apparatus, as will be described. It should be noted at this point that the charging zone 22 also contains apparatus (not illustrated) for introducing a "cold charge" of scrap steel. Large amounts of pollutants also are evolved during the introduction of a "cold charge".

It will be observed in FIGS. 1 and 2 that spaced-apart, vertically presented, traverse baffles 32, 33 are provided on opposite sides of each of the furnaces 28. The transverse baffles 32, 33 extend upwardly to the splitter baffle 26 and from the longitudinal baffle 21 to the exterior wall 15 and pitched roof 14. The transverse baffles 32, 33 cooperate with the longitudinal baffle 21, the exterior wall 15, and the roof 14 to define a charging aisle ventilator shaft 34 adjacent to each of the furnaces 28. The baffles 32, 33 present lower edges 35 (FIG. 2) spaced above the charging apparatus 36. The charging aisle ventilator shaft 34 presents a discharge opening 37 (FIGS. 2 and 3) communicating with the interior of the monitor ventilator 18.

Figure 4:
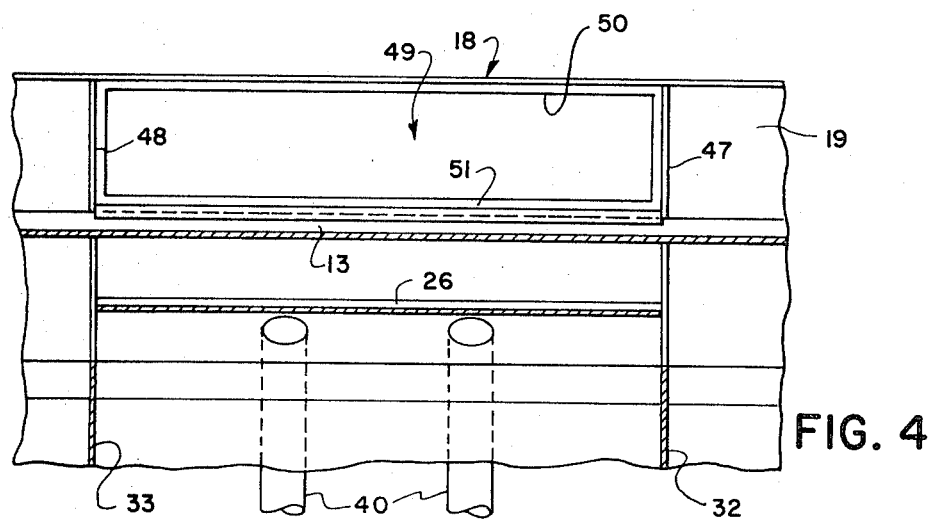
FIG. 4 is a cross-sectional view taken along the line 4—4 of FIG. 1.

Referring to FIGS. 3 and 4, the monitor ventilator 18 is provided with spaced-apart ventilator baffles 47, 48 which coincide with the transverse baffles 32, 33 respectively. The ventilator baffles 47, 48 cooperate with the lateral cowling 19 to provide a ventilator compartment 49 which communicates with the furnace aisle ventilator shaft 27 and the charging aisle ventilator shaft 34 through the openings 25, 37 respectively. The ventilator compartment 49 communicates with the atmosphere through a ventilator discharge opening 50. A suitable seal 51 is presented at the periphery of the ventilator discharge opening 50 for engagement by the damper 20 thereby to render the ventilator discharge opening 50 substantially air tight, for a purpose hereinafter to be described. It will be appreciated that the damper 20 constitutes flow control means for interrupting the flow of gases through the ventilator means 18 to the atmosphere.

In addition, a second seal 52 may be provided between the lower end of the lateral cowling 19 and upper edge 16 of the exterior wall 15. As illustrated in FIG. 3, the furnace aisle ventilator shaft opening 25 may be provided with second flow control means, such as an operating louver 53, for substantially entirely sealing the opening 25.

The building 10 is provided with exhaust means 38 for withdrawing the gases and pollutants emitted during a charging operation from the charging aisle 22 and for directing the same to pollution control apparatus schematically illustrated at 39 (FIG. 1). The pollution control apparatus 39 may comprise, for example, a bag house or an electrostatic precipitator. The exhaust means 38 includes take-off ducts 40 having upper ends communicating with a main duct 41. Each of the take-off ducts 40 is provided with a damper or valve 43 (FIG. 2) preferably of the electrically operated type. A suction fan schematically illustrated at 44 (FIG. 1) or other suitable gas and solids removal apparatus is incorporated into the main duct 41. The outlet of the suction fan 44 extends to the pollution control apparatus 39.

Figure 5:
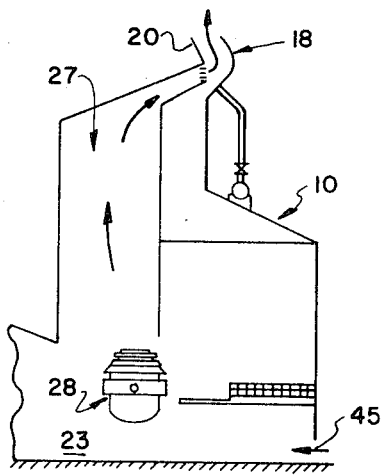
FIG. 5 is an elevation view schematically illustrating the ventilation of the building of FIG. 1 during a purification cycle.

FIG. 5 illustrates the ventilation of the furnace aisle 23 during a purification cycle. It should be noted that cleaning of the hot gases, vapors, fumes and dust discharged from the furnace 28 is accomplished by conventional apparatus (not illustrated), such as briefly described in the JUENG patent, supra. During the purification cycle, the damper 20 of the monitor ventilator 18 is in its open position thereby allowing gravity ventilation of the furnace aisle 23. The heated air discharged through the monitor ventilator 18 is replaced by fresh air which enters the building 10, for example, through a fresh air inlet 45. At the end of the purification cycle, the furnace is tilted to pour the finished heat of steel through the tap hole into teeming ladles.

Figure 6:
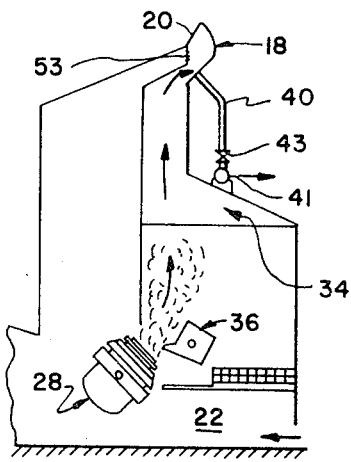
FIG. 6 is an elevation view, schematically illustrating the operation of the charging aisle exhaust system of this invention.

Prior to introducing a "hot charge" into the now tilted furnace 28 (FIG. 6), the ventilator damper 20 and the operating louver 53 are closed; the valves 43 are opened; and the suction fan 44 (FIG. 1) is energized. As the "hot charge" is introduced into the furnace, a large volume of pollutants is produced which are drawn upwardly through the charging aisle ventilator shaft 34 into the take-off ducts 40. The pollutants are conveyed through the take-off ducts 40 to the main duct 41 and thence to the pollution control apparatus 39 (FIG. 1). At the completion of the "hot charge" and after all of the pollutants have been cleared from the charging aisle area, the suction fan 44 (FIG. 1) is de-energized; the valves 43 are closed; and the damper 20 and operating louver 53 are opened for normal exhaust. The furnace 28 is the pivoted counterclockwise into a vertical orientation (FIG. 5) for the purification cycle.

The charging aisle exhaust system of this invention has been described in conjunction with a two aisle building which houses only the charging aisle and the furnace aisle and wherein the teeming aisle is housed in a separate adjoining building. It should be evident that the charging aisle exhaust system of this invention may also be incorporated into a three aisle building such as described and illustrated in the JUENG patent, supra.

I claim:

1. In a building housing steel-making process equipment including a high-temperature furnace and charging apparatus for introducing a charge into said furnace during a charging operation; said building having opposed walls and a roof; a vertically presented, longitudinal baffle intermediate of the said opposed walls and dividing the interior of said building into a first side portion containing the said charging apparatus and a second side portion containing the said high-temperature furnace; and ventilator means having (a) a ventilator inlet opening communicating with said first side portion and said second side portion, and (b) a ventilator discharge opening for discharging ventilation air from said building to the atmosphere; the improvement comprising:

pollution control apparatus;

flow control means operable during a charging operation for preventing the flow of gases from said first side portion, through said ventilator means to the atmosphere; and exhaust means having an inlet communicating with said first side portion between said charging apparatus and said flow control means for withdrawing pollutants emitted during the charging operation from the said first side portion of said building and directing the same to said pollution control apparatus.

2. The improvement defined in claim 1 wherein the said flow control means comprises a damper presented at the said discharge opening of said ventilator means.

3. The improvement defined in claim 2 wherein said exhaust means includes take-off ducts communicating with the interior of said ventilator means.

4. The improvement defined in claim 1 including second flow control means operable during a charging operation for preventing the flow of gases from said second side portion to said ventilator means.

5. The improvement defined in claim 1 wherein said ventilator means is positioned above the said first side portion, said longitudinal baffle presents an upper edge at a level below said roof; and including a splitter baffle extending from said upper edge of said longitudinal baffle, through said first side portion to said ventilator inlet opening.

6. The improvement defined in claim 1 including vertically presented transverse baffles disposed within said first side portion, on opposite sides of said high-temperature furnace, and spaced above said charging apparatus;

said transverse baffles cooperating with said longitudinal baffle and the wall of said first side portion to define a vertically presented ventilator shaft communicating with said ventilator inlet opening.

7. The improvement defined in claim 6 including spaced-apart ventilator baffles extending transversely of said ventilator means and providing a ventilator compartment, one of said ventilator baffles coinciding with each of said transverse baffles.

* * * * *